(12) United States Patent
Paris

(10) Patent No.: US 7,104,356 B2
(45) Date of Patent: Sep. 12, 2006

(54) ADJUSTABLE FOOT SUPPORT

(75) Inventor: Joshua Paris, Portland, OR (US)

(73) Assignee: ProMoto Billet, Nampa, ID (US)

( * ) Notice: Subject to any disclaimer, the term of this patent is extended or adjusted under 35 U.S.C. 154(b) by 205 days.

(21) Appl. No.: 10/648,411

(22) Filed: Aug. 25, 2003

(65) Prior Publication Data
US 2005/0045410 A1 Mar. 3, 2005

(51) Int. Cl.
B60K 26/00 (2006.01)
(52) U.S. Cl. .......................... 180/334; 74/564
(58) Field of Classification Search ................ 180/334; 280/291; 296/75; 74/564, 560, 594.4, 594.6; D12/125
See application file for complete search history.

(56) References Cited

U.S. PATENT DOCUMENTS

| 5,826,900 A | * | 10/1998 | Steele | 280/291 |
| 6,339,972 B1 | | 1/2002 | Paris | |
| 6,719,316 B1 | * | 4/2004 | Anthony | 280/291 |
| 6,745,643 B1 | * | 6/2004 | Lubanski | 74/594.6 |

* cited by examiner

Primary Examiner—Faye M. Fleming
(74) Attorney, Agent, or Firm—Schwabe Williamson & Wyatt

(57) ABSTRACT

A method and apparatus is provided that pertains to an adjustable foot support of a motorized vehicle. An insert is placed in a bore of the foot support mounting member or the mounting bracket mounting member to enable coupling of a foot support to a mounting bracket attached to the motorized vehicle. The insert can be inserted from either an upper side or a lower side of the mounting member, which will adjust the lateral position of the foot support relative to the mounting bracket, thereby ergonomically accommodating different riders' needs and preferences.

20 Claims, 2 Drawing Sheets

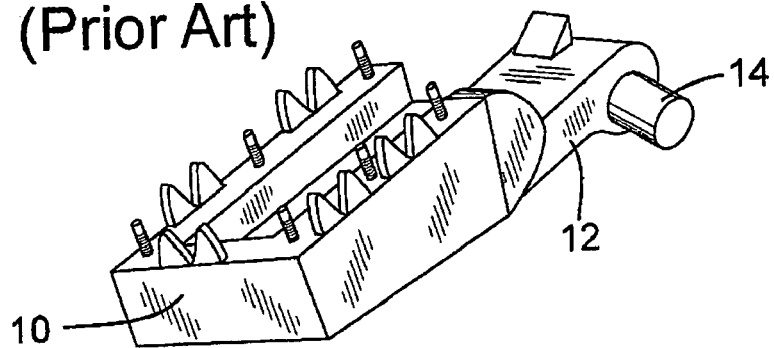
FIG. 1 (Prior Art)
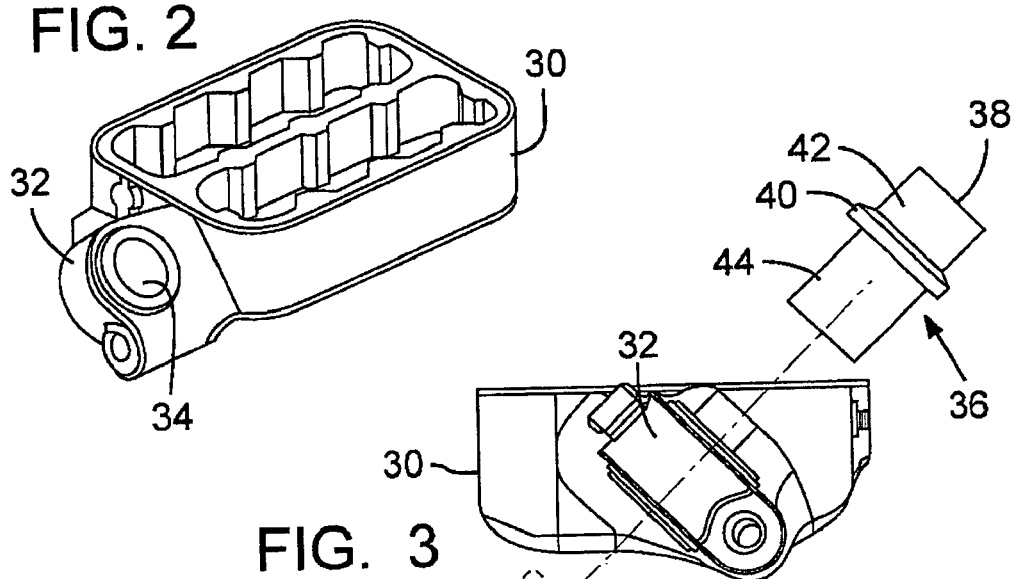
FIG. 2
FIG. 3
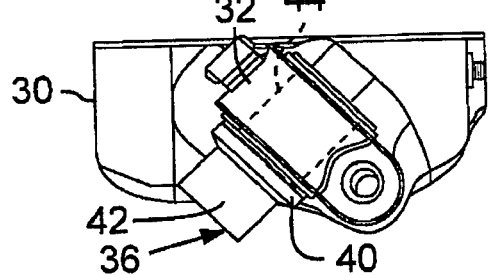
FIG. 4A
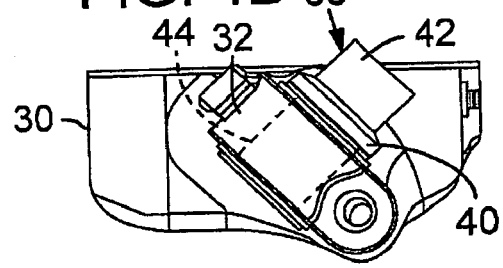
FIG. 4B ns code is US 7,104,356 B2

ADJUSTABLE FOOT SUPPORT

FIELD OF THE INVENTION

This invention pertains to and apparatus and method directed to adjusting the position of a foot support on a motorized vehicle.

BACKGROUND OF INVENTION

Riders of motorized vehicles, including but not limited to motorcycles, all terrain vehicles and the like, depend on foot supports or foot pegs to generally maintain balance, assist in maneuvering the motorized vehicle, and to shift the rider's weight from side to side. The foot support protrudes laterally from the motorized vehicle and connects to the frame of the motorized vehicle through a mounting bracket attached to the motorized vehicle frame. The mounting bracket typically consists of two spaced apart lobes or bosses.

FIG. 1 is a perspective view of a foot support that is of a prior art design, and which is adapted for engagement with a mounting bracket on the motorized vehicle (not shown). Foot support 10 has a mounting member 12 that extends from one end of the foot support 10. The mounting member 12 has a protrusion 14, typically cylindrical in shape, that projects outwardly from the mounting member 12, and is adapted for pivotable engagement with the mounting bracket on the motorized vehicle.

A problem with the current design of foot supports exists, however, in that the fixed relationship of mounting member and protrusion result in the foot support being confined to one position laterally relative to the mounting bracket position on the motorized vehicle. Thus, regardless if you are a rider who stands 6 feet 5 inches tall or a rider that stands five feet four inches tall, for example, the rider's feet are confined to the same position relative to the mounting bracket. This results in certain comfort, safety and ergonomic issues for riders, depending on their height and riding preferences. It has been found that even a slight adjustment of the foot support either upward or downward relative to the mounting bracket can dramatically improve the riders comfort, ergonomics and improve the ability to more readily maneuver the motorized vehicle.

One solution to this problem has been to cut off the protrusion 14 from mounting member 12, thereby effectively creating a spacer (not shown) that can be used to consume the gap between the mounting member and the mounting bracket to prevent unnecessary axial movement. The foot support can be raised or lowered relative to the mounting bracket by placement of the spacer on either the bottom side of the mounting member or the top side respectively. Though this solves the problem of allowing for different foot support positions, it has been found that there is a problem with this design in that the pin used to secure the foot support to the mounting bracket is placed under significant stress as and is prone to breaking. The only way to solve this problem has been to use high-tempered hardened steel or other stronger materials for the pin, which results in a higher cost.

It is therefore desirable to take advantage of a foot support that has multiple positions given the same mounting bracket location on the motorized vehicle, without requiring a hardened pin for securing the foot support.

BRIEF DESCRIPTION OF DRAWINGS

FIG. 1 is a perspective view of a current foot support on a motorized vehicle;

FIG. 2 is a perspective view of an embodiment of a foot support of the present invention;

FIG. 3 is a side view of the foot support of FIG. 2 showing an embodiment of an insert;

FIG. 4A is an end view of an embodiment of a foot support of the present invention with the insert of the present invention in an upper position;

FIG. 4A is an end view of an embodiment of a foot support of the present invention in a lower position.

DESCRIPTION

Figure 5:
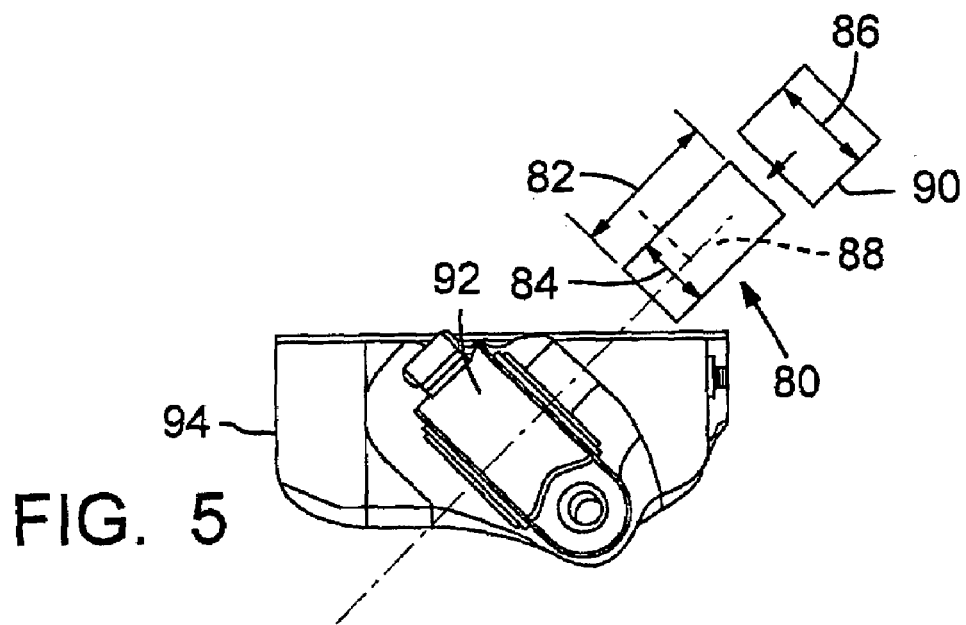
FIG. 5 is an end view of an embodiment of a foot support of the present invention.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

FIG. 2 is a perspective view of an example of an embodiment of the present invention. Foot support 30 has mounting member 32 projecting from one end of foot support 30 Mounting member 32 is angularly positioned such that its axial center corresponds to that of the mounting bracket on the motorized vehicle (not shown) to enable pivotable engagement therewith. Mounting member 32 has a bore 34, which has a predetermined diameter that is less than the overall diameter of mounting member 32. In the illustrated embodiment bore 34 passes through mounting member 32, thus giving bore 34 generally the same axial height as the thickness of mounting member 32.

FIG. 3 is an end view of the embodiment of the foot support 30 and mounting member 32 shown in FIG. 2. Also shown is an example of insert 36. Insert 36 has an outer diameter that is less than the diameter of bore 34, which enables insert 36 to engage bore 34. In the illustrated embodiment, the outer diameter of insert 36 is only slightly less than the diameter of bore 34. This allows insert 34 to snugly engage bore 34 with minimal play between the inside wall of bore 34 and the outside wall of insert 36. Such a fit strengthens the mounting member 32, such that it can accommodate the weight applied by a rider without failing.

In the illustrated embodiment, insert 36 has a bore insert stop 40 on the perimeter of insert 36, which creates an upper portion 42 and lower portion 44 of insert 36. Bore insert stop 40 allows the lower portion 44 of insert 36 to engage bore 34 a predetermined distance, and prevents insert 36 from passing all the way through bore 34 and thus prevents the foot support from freely sliding up and down the entire length of bore insert 36. Though FIG. 3 shows the use of a flange as bore insert stop 40, a variety of devices can be used to limit the engagement of insert 36 into bore 34, including, but not limited to, providing an insert having an upper portion having a determined larger than the diameter of bore 34 and a lower portion with a diameter less than boar 34, or using a lock ring to engage an accommodating slot in insert 36 to limit engagement of insert 36 with bore 34.

FIGS. 4A and 4B show insert 36 engaged in bore 34 up to the bore insert stop 40. Once engaged, the mounting member 32 of foot support 30 can engage a complementary mounting bracket secured to the frame of the motorized vehicle. (not shown). In the preferred embodiment, the placement of bore insert stop 40 is placed so that the overall length of the upper portion 42 of insert 36 and the mounting member 32 is sized to engage the mounting bracket on the motorized vehicle (not shown), thereby minimizing axial movement. A fastener, such as a pin can secure foot support 30 to the mounting bracket of the motorized vehicle, by engaging an inner bore 38 of insert 36. Insert 36 engaging bore 34 provides the necessary strength to allow a standard mounting pin to be used to secure foot support 30 to the bracket mounted on the motorized vehicle without special heat-treating or using high-strength costly materials.

FIG. 4A shows insert 36 engaging bore 34 from the lower side of mounting member 32, such that upper portion 42 protrudes from mounting member 32 in a downwardly direction. In such a position, and when secured to the mounting bracket, foot support 30 will be an upper position laterally relative to the mounting bracket of the motorized vehicle, thus accommodating riders with shorter legs or those who ergonomically or performance-wise prefer their feet to be higher. FIG. 4B shows insert 36 engaging bore 34 from the upper side of mounting member 32, such that upper portion 42 protrudes in an upwardly direction. In such a position, and when secured to the mounting bracket, the foot support will be in a lower position laterally relative to the mounting bracket of the motorized vehicle, thus accommodating riders with longer legs or those who ergonomically or performance-wise prefer their feet to be lower FIG. 5 is an example of an adjustable foot support in accordance with another embodiment of the present invention. Insert 80 has a defined outer diameter 84 and a height 82 that this sized to substantially span the distance between the bosses of the mounting bracket attached to the motorcycle. Insert 80 has an inner bore adapted to receive a pin to couple the foot support to the mounting bracket. In the illustrated embodiment, the bore insert stop is a spacer 90, which has an inner bore with a diameter 86 that is slightly larger than the outer diameter 84 of insert 80.

Insert 80 is adapted to engage the inner bore of mounting member 92. To adjust the foot support 94, the spacer 90 can either be placed on the upper side of mounting member 92 overlapping an upper portion of insert 80, as shown in FIG. 5, thereby causing the foot support to be in the lower position. Though not shown, the spacer 90 may also be placed on the lower side of mounting member 92, thereby causing the foot support to be in the upper position when coupled to the mounting bracket of the motorized vehicle. And because insert 80 spans substantially the distance between the bosses of the mounting bracket (not shown), an ordinary pin that is not specially hardened may be used to secure foot support 94 to the mounting bracket.

Figure 6:
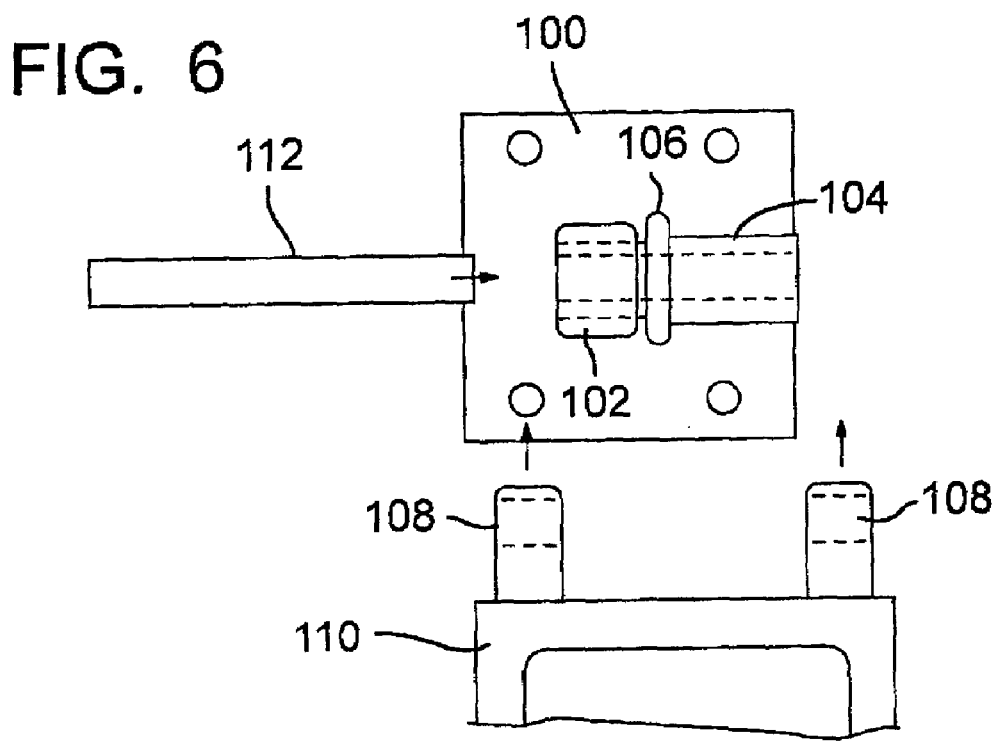
FIG. 6 is an end view of a mounting bracket and foot support for a motorized vehicle in accordance with an embodiment of the present invention.

As discussed in the background section, mounting brackets most commonly consist of two spaced apart bosses which mounting member of the foot support engages and is secured by a pin. Another common type of mounting bracket 100, as shown in FIG. 6 is the reverse situation, were the mounting bracket includes a substantially thicker single boss 102, and the foot support 110 has two spaced apart bosses 108 that are adapted to couple to mounting bracket boss 102 using pin 112. The embodiments discussed above are also applicable to this type of mounting arrangement, in that, for example, insert 104 having bore insert stop 106 will engage single boss 102 of mounting bracket 100. Bore insert stop will be positioned on one side of the mounting bracket boss 102 or the other in order to accomplish the adjustability of the foot support 110 position without sacrificing strength.

Though not shown, another embodiment includes the use of a spacer as the bore insert stop, as discussed with respect to the embodiment shown in FIG. 5. The difference being that the insert nests in the mounting member of the mounting bracket. The spacer can then be positioned on either side of the mounting member depending on the riding position desired, then the bosses of the foot support are positioned for engagement such that a pin can pass through one foot support boss, then through the inner bore of the insert and through the other boss of the foot support.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An adjustable foot support for a motorized vehicle, comprising:
   a mounting member connected to one end of the foot support, the mounting member having a first side and a second side;
   a bore extending from the first side to the second side of the mounting member, the bore having a defined diameter;
   a bore insert having an outer diameter adapted to allow the bore insert to engage the bore of the mounting member from both the first side or the second side; and
   a bore insert stop adapted to prevent the bore insert from passing through the bore.

2. The foot support of claim 1, wherein the bore insert has an inner bore of a defined diameter, the inner bore being adapted to receive a fastener for attaching the foot support to a mounting bracket of the motorized vehicle.

3. The foot support of claim 1, wherein the bore insert stop is a flange, the flange having a diameter larger than the bore.

4. The foot support of claim 1, where in the bore insert stop is a spacer, the spacer having a spacer inner bore that is larger in diameter than the bore insert outer diameter and an outer diameter larger than the mounting member bore.

5. The foot support of claim 1, wherein the bore insert stop is defined by a portion of the bore insert having an outer diameter larger than the diameter of the mounting member bore and a portion of the bore insert having an outer diameter smaller than the mounting member bore.

6. A motorized vehicle comprising:
   a mounting bracket secured to the motorized vehicle;
   a foot support pivotally coupled to the mounting bracket, the foot support further comprising
   a mounting member connected to one end of the foot support, the mounting member having a first side and a second side;

a bore extending from the first side to the second side of the mounting member, the bore having a defined diameter;

a bore insert having an outer diameter adapted to allow the bore insert to engage the bore of the mounting member from both the first side or the second side; and a bore insert stop adapted to prevent the bore insert from passing through the bore.

7. The foot support of claim 6, wherein the bore insert has an inner bore of a defined diameter, the inner bore being adapted to receive a fastener for attaching the foot support to the mounting bracket.

8. The foot support of claim 6, wherein the bore insert stop is a flange, the flange having a diameter larger than the bore.

9. The foot support of claim 6, where in the bore insert stop is a spacer, the spacer having a spacer inner bore that is larger in diameter than the bore insert outer diameter and an outer diameter larger than the mounting member bore.

10. The foot support of claim 6, wherein the bore insert stop is defined by a portion of the bore insert having an outer diameter larger than the diameter of the mounting member bore and a portion of the bore insert having an outer diameter smaller than the mounting member bore.

11. A foot support mounting bracket for a motorized vehicle, comprising:

a mounting member connected to the mounting bracket, the mounting member having a first side and a second side;

a bore extending from the first side to the second side of the mounting member, the bore having a defined diameter;

a bore insert having an outer diameter adapted to allow the bore insert to engage the bore of the mounting member from both the first side or the second side; and a bore insert stop adapted to prevent the bore insert from passing through the bore.

12. The foot support mounting bracket of claim 11, wherein the bore insert has an inner bore of a defined diameter, the inner bore being adapted to receive a fastener for attaching a foot support to the mounting bracket.

13. The foot support mounting bracket of claim 11, wherein the bore insert stop is a flange, the flange having a diameter larger than the bore.

14. The foot support mounting bracket of claim 11, where in the bore insert stop is a spacer, the spacer having a spacer inner bore that is larger in diameter than the bore insert outer diameter and an outer diameter larger than the mounting member bore.

15. The foot support mounting bracket of claim 11, wherein the bore insert stop is defined by a portion of the bore insert having an outer diameter larger than the diameter of the mounting member bore and a portion of the bore insert having an outer diameter smaller than the mounting member bore.

16. An adjustable foot support for a motorized vehicle, comprising:

a mounting member connected to one end of the foot support, the mounting member having a first side and a second side;

a bore extending from the first side to the second side of the mounting member, the bore having a defined diameter;

a bore insert having an outer diameter adapted to allow the bore insert to engage the bore of the mounting member from both the first side or the second side;

a bore insert stop adapted to prevent the bore insert from passing through the bore; and wherein the bore insert has an inner bore of a defined diameter, the inner bore being adapted to receive a fastener for attaching the foot support to a mounting bracket of the motorized vehicle.

17. A motorized vehicle comprising:

a mounting bracket secured to the motorized vehicle;

a foot support pivotally coupled to the mounting bracket, the foot support further comprising a mounting member connected to one end of the foot support, the mounting member having a first side and a second side;

a bore extending from the first side to the second side of the mounting member, the bore having a defined diameter;

a bore insert having an outer diameter adapted to allow the bore insert to engage the bore of the mounting member from both the first side or the second side, and having an inner bore of a defined diameter, the inner bore being adapted to receive a fastener for attaching the foot support to the mounting bracket; and a bore insert stop adapted to prevent the bore insert from passing through the bore.

18. A foot support mounting bracket for a motorized vehicle, comprising:

a mounting member connected to the mounting bracket, the mounting member having a first side and a second side;

a bore extending from the first side to the second side of the mounting member, the bore having a defined diameter;

a bore insert having an outer diameter adapted to allow the bore insert to engage the bore of the mounting member from both the first side or the second side and having an inner bore of a defined diameter, the inner bore being adapted to receive a fastener for attaching a foot support to the mounting bracket; and a bore insert stop adapted to prevent the bore insert from passing through the bore.

19. The foot support of claim 1, wherein the insert stop is positioned on the insert such that a predetermined space is created between the mounting member first side or second side and a mounting bracket on the motorized vehicle.

20. The foot support of claim 6, wherein the insert stop is positioned on the insert such that a predetermined space is created between the mounting member first side or second side and the mounting bracket of the motorized vehicle.

* * * * *